United States Patent [19]

Ishii

[11] Patent Number: 4,742,352
[45] Date of Patent: May 3, 1988

[54] RADIO COMMUNICATION SYSTEM EQUIPPED WITH ELECTRONIC APPLIANCE

[75] Inventor: Hiroshi Ishii, Tokyo, Japan

[73] Assignee: Casio Computer Co., Ltd., Tokyo, Japan

[21] Appl. No.: 785,164

[22] Filed: Oct. 7, 1985

[30] Foreign Application Priority Data

Oct. 11, 1984 [JP] Japan .................................. 59-213046

[51] Int. Cl.⁴ .............................................. H04Q 1/00
[52] U.S. Cl. ........................... 340/825.47; 340/825.48; 364/705; 455/89
[58] Field of Search ........... 340/311.1, 825.44–825.48; 368/10, 12, 13, 41, 47; 364/705; 455/89, 31, 32, 343, 35–38

[56] References Cited

U.S. PATENT DOCUMENTS

| | | | |
|---|---|---|---|
| 3,937,004 | 2/1976 | Natori et al. | 340/311.1 X |
| 3,976,995 | 8/1976 | Sebestyen | 340/792 X |
| 4,162,610 | 7/1979 | Levine | 368/10 X |
| 4,181,893 | 1/1980 | Ehmke | 340/311.1 |
| 4,334,319 | 6/1982 | Gurry | 340/311.1 X |
| 4,383,257 | 5/1983 | Giallanza et al. | 340/825.47 |
| 4,384,361 | 5/1983 | Masaki | 340/311.1 X |
| 4,398,192 | 8/1983 | Moore et al. | 340/825.44 |
| 4,563,680 | 1/1986 | Nakajima | 340/825.48 X |

Primary Examiner—Ulysses Weldon
Attorney, Agent, or Firm—Frishauf, Holtz, Goodman & Woodward

[57] ABSTRACT

A radio communication system is used with an electronic appliance such as a wristwatch. The radio communication system includes a single transmitter unit including a first reference clock pulse generator which transmits paging data together with message data. A plurality of receiver units each have a second reference clock pulse generator which is built in the appliance, to decode the paging and message data uniquely characterizing that receiver unit with the help of a second reference clock pulse which has been synchronized with a first reference clock pulse. The paged operator is warned and the message is displayed.

11 Claims, 14 Drawing Sheets

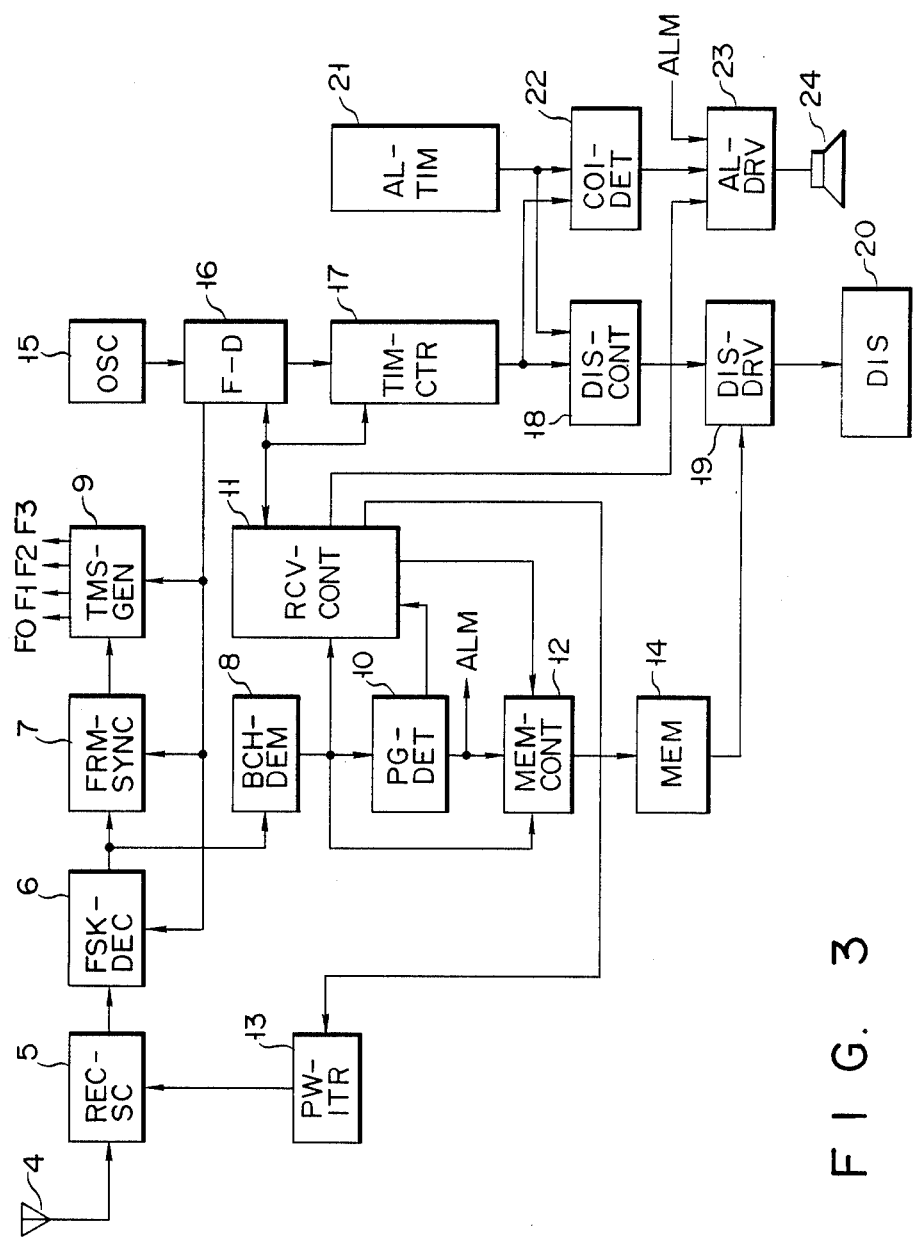
F I G. 3

POWER INTERRUPT
CIRCUIT 13

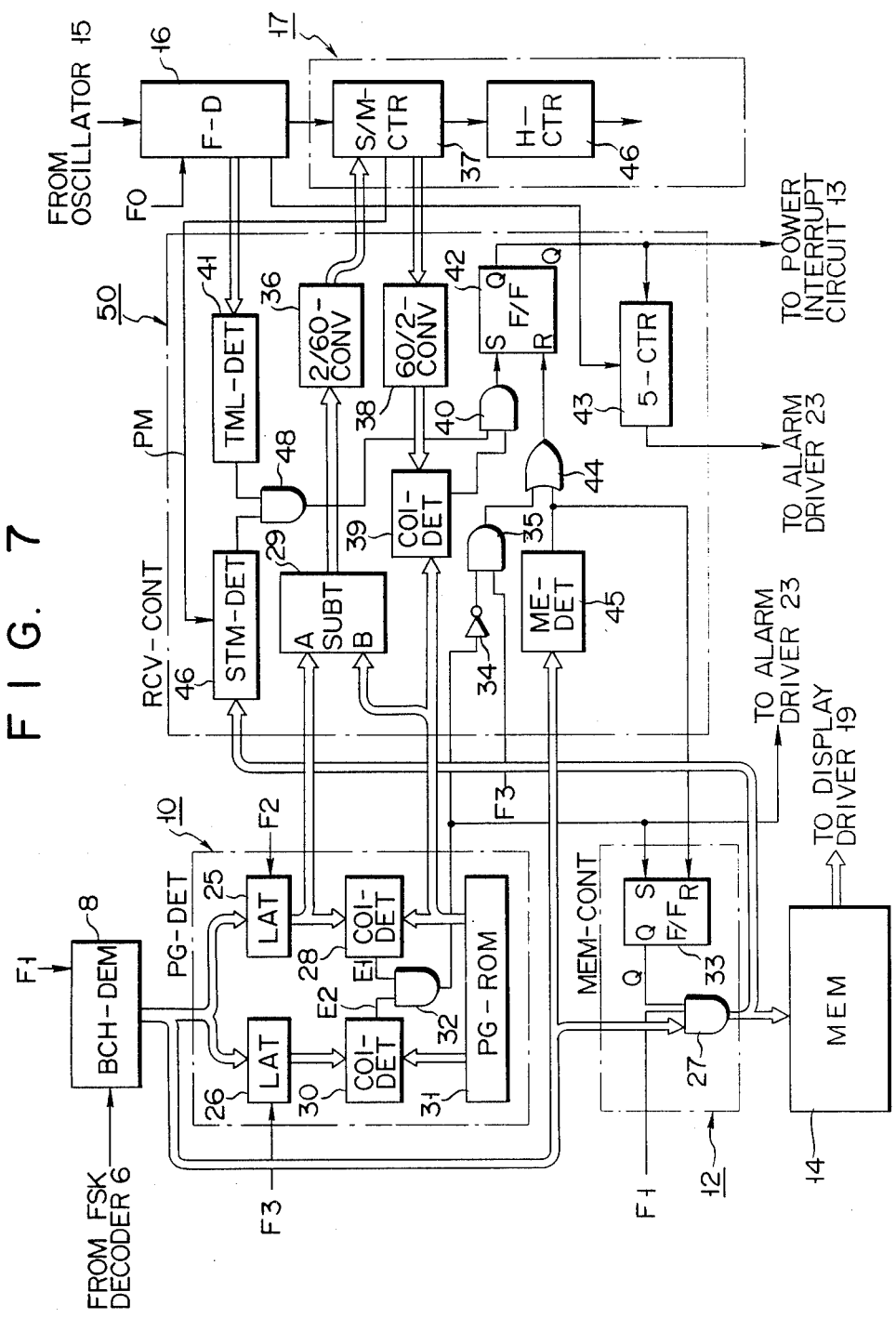
F I G. 7

F I G. 15

| ADDRESS<br>Ai ---- A1 A2 A0 | CODE STORAGE SECTION |
|---|---|
| 0 ----- 0  0  0 | MOST SIGNIFICANT PART 8BITS |
| 0 ----- 0  0  1 | LEAST SIGNIFICANT PART 8BITS |
| 0 ----- 0  1  0 | MOST SIGNIFICANT PART 8BITS |
| 0 ----- 0  1  1 | LEAST SIGNIFICANT PART 8BITS |
| 0 ----- 1  0  0 | MOST SIGNIFICANT PART 8BITS |

RADIO COMMUNICATION SYSTEM EQUIPPED WITH ELECTRONIC APPLIANCE

BACKGROUND OF THE INVENTION

1. Field of the Invention

The present invention relates to a radio communication system in which a single transmitter unit including a first reference clock pulse generator transmits paging data together with message data, and a plurality of receiver units each including a second reference clock pulse generator for decoding the paging and message data uniquely characterizing that receiver unit with the help of the second reference clock pulse which has been synchronized with the first reference clock pulse, whereby the paged operator is warned and the message is displayed.

2. Description of Prior Art

It is inconvenient to be unable to communicate with a needed staff member when he is absent from his desk but within the same building, when immediate communication is desirable. In this case, it is possible to communicate among the staff by radio communication devices such as transceivers. However, this communication system cannot provide the best solution from an economic viewpoint.

A conventional POCKET BELL radio paging service system is well known for paging individual staff in a remote or indefinite area. According to this system, all staff, i.e., all subscribers are divided into, for instance, 15 groups, and each individual subscriber in each group is identified in accordance with a group code and a paging code, thereby paging the specific individual with an alarm.

A conventional public paging system has a complex circuit arrangement for identifying each individual and consumes considerable power. Relatively large batteries must be used in this paging system. As a result, it is in fact difficult to install a receiver unit into a compact electronic appliance such as a wristwatch or a pocketable calculator.

Paging is performed with an alarm but it does not include a message display on the receiver unit. So the paged person must contact the calling party, thus causing delay. Furthermore, the message may not be properly acknowledged, resulting in inconvenience.

It is an object of the present invention to provide a radio communication system which has a simple circuit arrangement and low power consumption, which has a compact receiver unit, and which can display contents of a message upon paging.

SUMMARY OF THE INVENTION

The object of the present invention is accomplished by providing a radio communication system, in which a transmitter end having a first reference clock pulse generator transmits digital transmission data, and a plurality of receiver ends associated with respective electronic appliances, operative under respective common power sources, each having at least a display panel and a second reference clock pulse generator, process the digital transmission data so as to display a message on the display panel and to give an alarm to a predetermined receiver operator of the paged receiver end, comprising transmitter processor means in the corresponding transmitter end, for modulating paging code and message data with the help of first reference clock pulses of the first reference clock pulse generator to produce the digital transmission data, and, signal decoder means in the corresponding receiver end, for decoding the paging code and message data with the help of second reference clock pulses of the second reference clock pulse generator only upon receipt of a paging code uniquely characterizing that receiver end, said second reference clock pulses being synchronized with the first reference clock pulses therein.

BRIEF DESCRIPTION OF THE DRAWINGS

These and other more detailed and specific objects and features of the present invention are more fully disclosed in the following specification, reference being made to the accompanying drawings in which:

FIG. 3 is an overall block diagram of the radio communication system shown in FIG. 1;

FIGS. 7 and 8 are detailed block diagrams of the major circuits of the system according to a second embodiment;

FIG. 15 illustratively shows the code memory employed in the system shown in FIG. 14.

DETAILED DESCRIPTION OF THE PREFERRED EMBODIMENTS

GENERAL DESCRIPTION OF THE INVENTION

Before proceeding with the various embodiments of the invention, basic operation of the radio communication system according to the invention will now be summarized.

Figure 1:
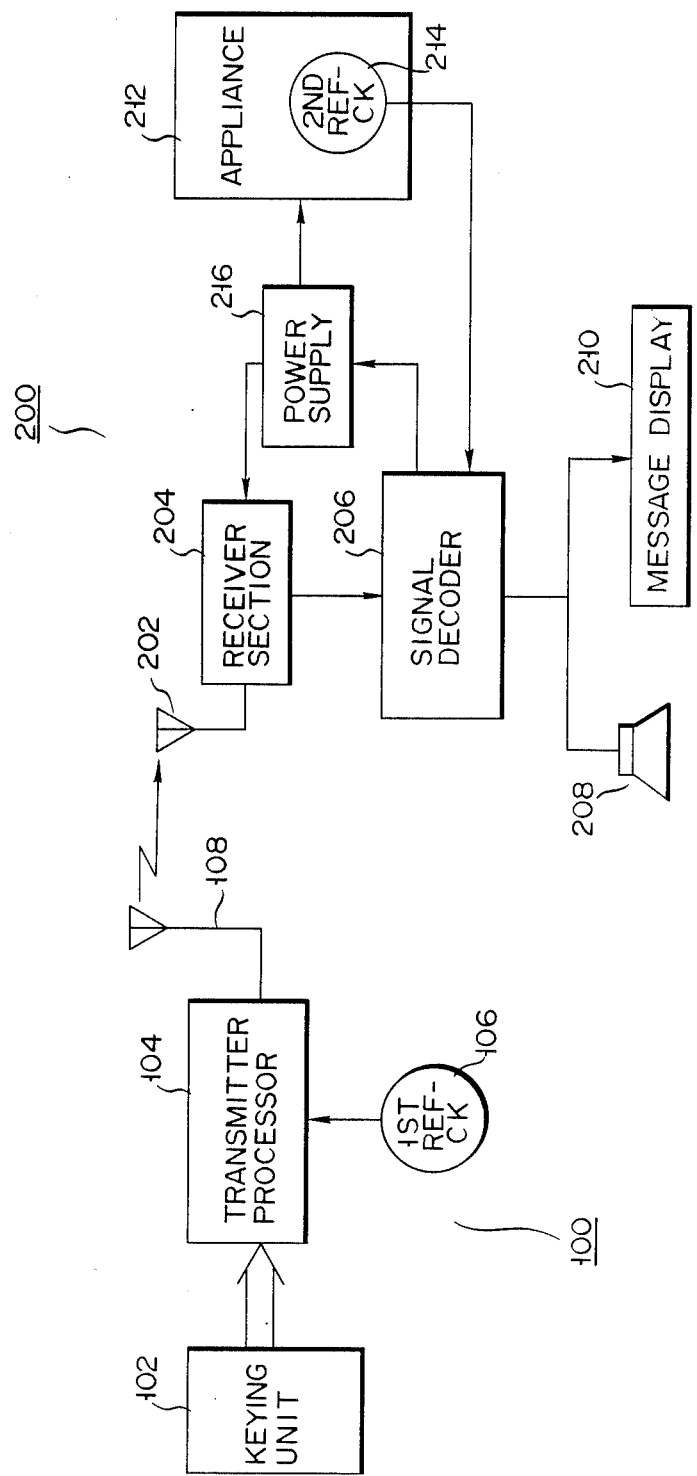
FIG. 1 is a schematic diagram of a radio communication system according to the invention.

Referring to FIG. 1, a schematic diagram of a radio communication system according to the present invention is shown, which is constituted by a transmitter end 100 and a receiver end 200.

In the transmitter end 100, a keying unit 102 such as a telephone set is provided to enter paging code data and also message code data into a transmitter processor 104. The transmitter processor 104 combines these data with reference clock pulses derived from a first reference clock pulse generator 106. Accordingly, a transmission signal containing these data and the first reference clock pulses is produced by means of, e.g., the frequency shift keying method (referred to as FSK). Then the transmission signal is transmitted from the processor 104 through a transmitter antenna 108. It should be noted that the paging code data is uniquely characterized for each of the corresponding receiver units.

The transmission signal is first received via a receiver antenna 202 by a receiver section 204 so as to be amplified and detected. Although a plurality of receiver units are provided in the receiver end 200, only one unit is shown for convenience. The detected signal is further decoded in a signal decoder 206 to identify the paging code uniquely characterizing that receiver unit 200. If the transmitted paging code is correct, then the detector 206 sends an alarm signal to an alarm device 208, and also the decoded message to a message display 210. The signal decoder 206 decodes the received signal by utilizing second reference clock pulses which have been synchronized with the first reference clock pulses contained in the transmission signal. These second reference clock pulses per se are also used for a small electronic appliance 212, e.g., an electronic timepiece. The second reference clock pulses are generated from a second reference clock pulse generator 214 provided in the small electronic applicance 212. As previously described, these second reference clock pulses need to be synchronized with the first reference clock pulses, because the paging code identification of the signal decoder 206 is carried out based upon the second reference clock pulses.

The receiver end 200 includes a signal power supply 216, usually dry batteries whose required capacity is relatively small. Generally, the receiver section 204 consumes relatively high power. Therefore, the power supply to the receiver section 204 is interrupted under the control of the signal decoder 206 in the case of no detection of the uniquely characterized paging code in the signal decoder 206.

The entire circuit of the receiver end except for the small electronic appliance can be constructed as small as possible. Power consumption of the receiver section can be considerably reduced so that both the small electronic appliance and the receiver unit can be driven by a single small power supply. Moreover, the paged operator can receive not only an alarm sound but a message display as well.

ARRANGEMENT OF FIRST EMBODIMENT

Figure 2:
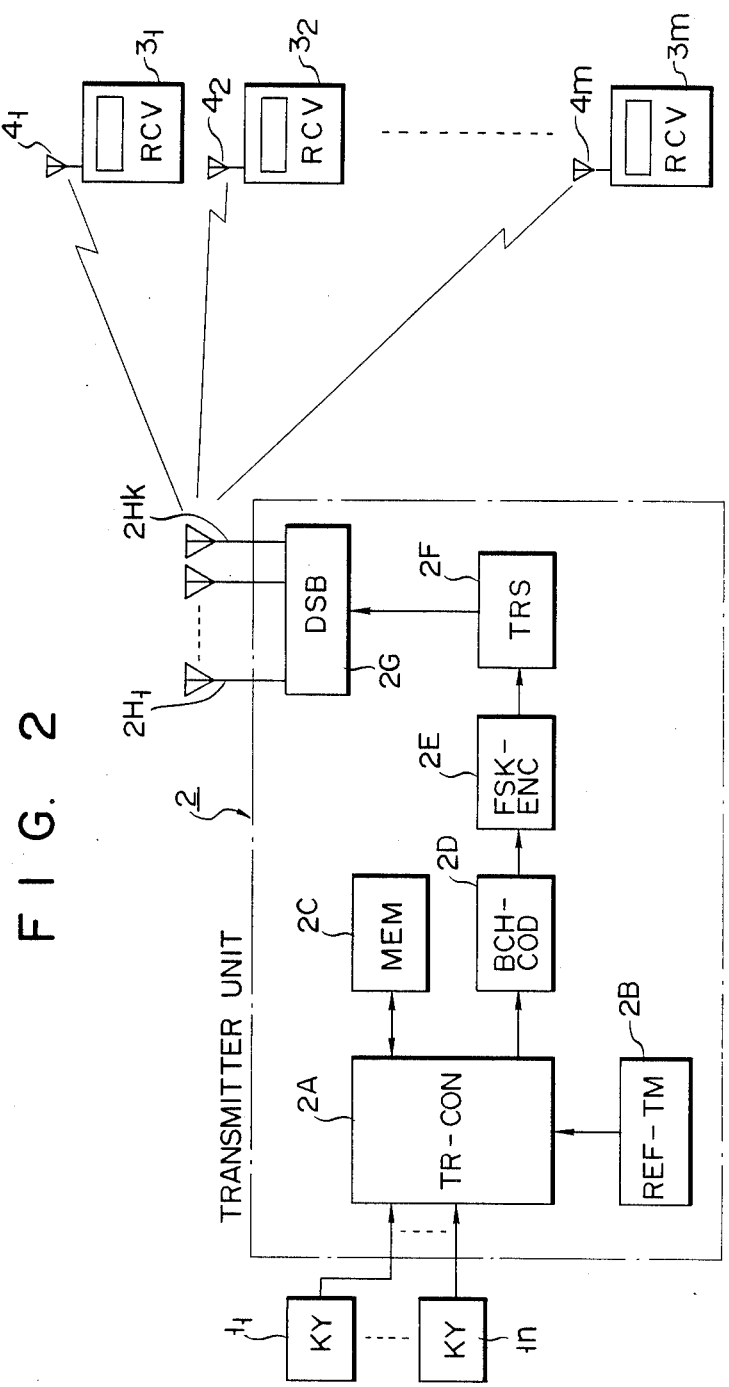
FIG. 2 is a schematic diagram for explaining a basic idea of a radio communication system equipped with an electronic watch according to a first embodiment.

FIG. 2 shows a block diagram of a radio communication system according to the invention in which a receiver unit is associated with an electronic wristwatch. It should be noted that both the transmitter unit 2 and the receiver units $3_1$ to $3_m$ constitute the present invention, but the wristwatch does not directly belong to the present invention.

In FIG. 2, reference numerals $1_1$ to $1_n$ denote n numbers of keyboards installed at predetermined locations on each floor of a building or a factory to key-in a paging code and a message. Output signals from the keyboards $1_1$ to $1_n$ are transmitted to a transmitter controller 2A in a transmitter unit 2 serving as a single base station installed in the building. The paging code mainly consists of a group code representing one of, e.g., 16 groups of staff member and an individual code uniquely representing each staff member belonging to a given group.

Accurate time data from a reference timer 2B as the first reference clock pulse generator is supplied to a controller 2A. On the basis of the accurate time data, the controller 2A controls transmission in synchronism with electronic wristwatches $3_1$ to $3_m$ each having a receiver unit and carried with the staff member within the building.

In the transmitter controller (TR-CON) 2A, message data input from the keyboards $1_1$ to $1_n$ is temporarily stored in a memory (MEM) 2C when a line is busy for transmission requests. During transmission, the controller 2A supplies transmission data, i.e., a paging code and message data to a BCH encoder 2D, and the input data is converted to BCH-coded data at a frequency of, e.g., 600 Hz (600 bits/sec.). This BCH-coded data is further supplied to an FSK (Frequency Shift Keying) encoder (FSK-ENC) 2E and is converted to actual data for transmission. The actual transmission data is supplied to a distributer 2G through a transmitter 2F and is distributed to transmitter antennas $2H_1$ to $2H_k$ arranged in correspondence with locations of the keyboards $1_1$ to $1_n$. The actual data is transmitted at a frequency of, for example, 30 MHz to 300 MHz (VHF).

The encoder 2E combines 1,200- and 2,400-Hz signals as second and fourth harmonics to form the actual transmission data.

Then, the data encoded by the FSK method is transmitted to a plurality of receiver units $3_1$ to $3_m$ via receiver antennas $4_1$ to $4_m$.

Referring to FIG. 3, a detailed description will now be made of an internal circuit of the receiver units. For the sake of simplicity, only one receiver unit is shown in FIG. 3. The receiving antenna 4 receives the VHF signal, i.e., transmission data of 600 bits/sec transmitted from the unit 2. Since the transmission data is BCH-encoded, 8-redundant bits are added to 8-bit data to constitute the transmission data as 16-bit data.

RECEIVING DATA

The format of the receiving data will be described in detail with reference to FIG. 4. Data of 0th to 15th groups are identical, and only the 0th data format will be described for the sake of simplicity. One-second time slots are allocated to the data of each group, so that the receiving time of each group is circulated every 16 seconds. The unit 2 starts transmitting data from the 0th group when the time of a reference timer 2B is set at 00 seconds (to be described in detail later). For this reason, the respective timers $3_1$ to $3_m$ must be synchronized with the unit 2.

Figure 4:
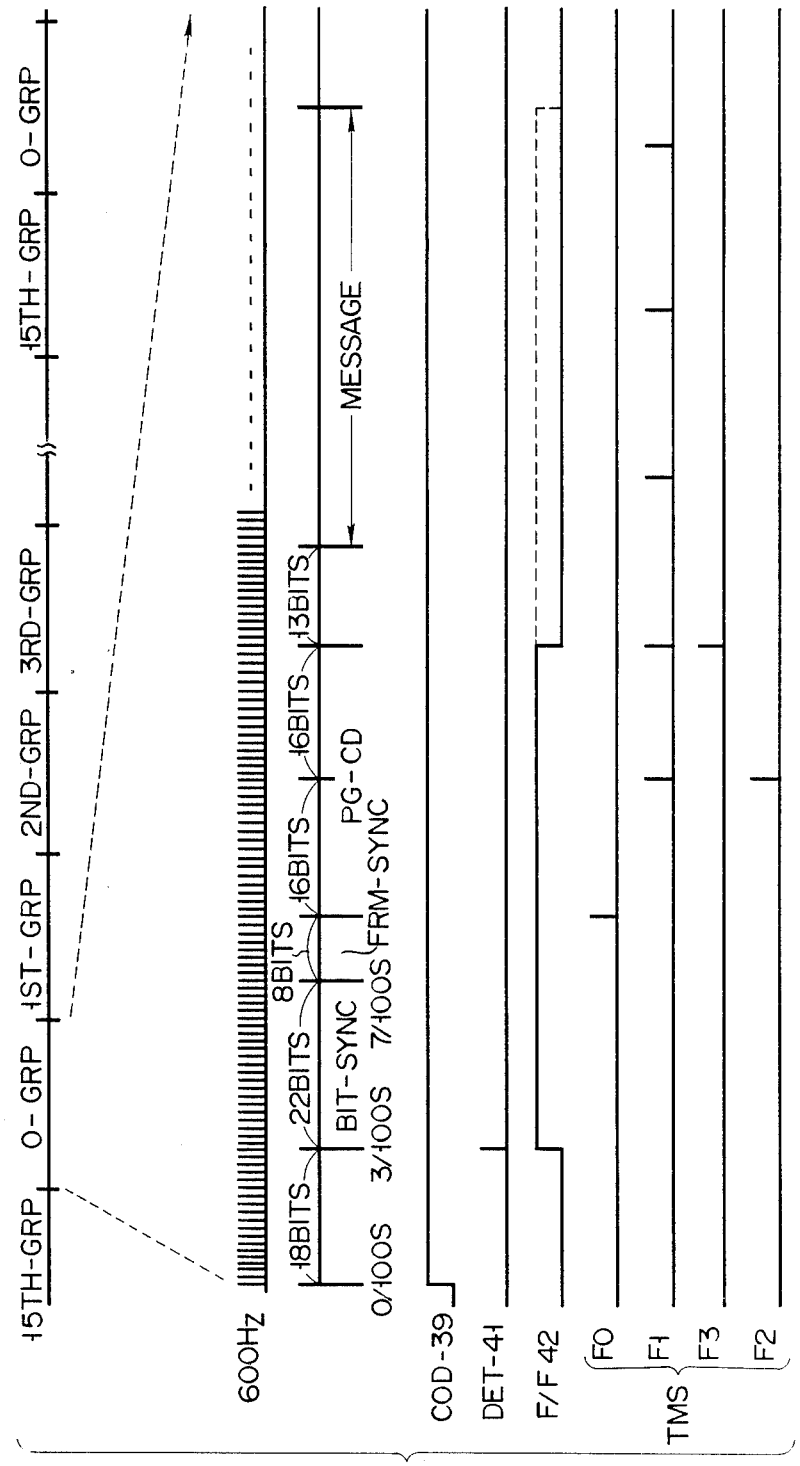
FIG. 4 shows a timing chart of the data transmission of the system shown in FIG. 1.

As shown in FIG. 4, 18-bit space data for correcting a receiving timing error is sent at the beginning of each group. The 18-bit space data is followed by 22-bit sync data and then 8-bit frame sync data. The 8-bit frame sync data is followed by 32-bit paging code data, 13-bit empty data and message data. The first half (16 bits) of the paging code data represents a group code, and the second half represents an individual code.

INTERNAL CIRCUIT OF RECEIVER UNIT

Referring back to FIG. 3, the signal received by the receiver antenna 4 is amplified and detected by a receiver section 5. The detected signal is decoded by the decoder 6 so as to achieve bit synchronization. An output from the decoder 6 is supplied to a frame sync circuit 7 and a BCH demodulator circuit 8.

The circuit 7 detects the frame sync data, and a detection signal therefrom is supplied to a timing signal generator 9. The generator 9 then generates timing signals F0, F1, F2 and F3. It should be noted that a frequency divider circuit 16 supplies the 1,200- and 2,400-Hz signals to the generator 9 to achieve the above operation. The signal F0 is transmitted in synchronism with the end bit of the frame sync data. The signal F1 is generated for every 16 bits from the signal F0; F2 is generated at the 16th bit from the signal F0; and F3 is generated at the 32th bit from the signal F0.

The circuit 8 receives the signal F0 and decodes the paging code data in the data supplied from the decoder 6 and supplies 8-bit data to a paging code detector circuit 10, a receiver control unit 11 and a memory control unit 12. The circuit 10 discriminates the group code and the individual code from the paging code, and a discrimination result is supplied to the units 11 and 12. The discrimination result is also supplied as an alarm signal ALM to an alarm driver 23 in a timepiece circuit (to be described later). When its own group is not paged in accordance with the discrimination result, that is, when its own reception allocation timing is not set, the unit 11 supplies a power off signal to a power interrupt circuit 13 for the receiver section 5. Otherwise, the unit 11 supplies a power on signal to the circuit 13. When the appliance is removed from the service area of the transmitter, the power is kept on (to be described later). In this case, the unit 11 supplies a signal to the alarm driver to generate an alarm sound at a speaker 24.

In the unit 11, the time data from the timepiece circuit is synchronized at the reception allocation timing of its own on the basis of the frame sync signal and the group code, so that the timepiece clock data is matched with the clock signal of the reference timer 2B in the unit 2.

The unit 12 controls a memory 14 to write message data therein. When the message data writing ends, the unit 12 interrupts the data writing in response to the signal from the unit 11. The message data written in the memory 14 is sent to a display driver in the timepiece circuit and is displayed on a display.

The circuits 4 to 14 constitute the receiver unit 3n ($1 \leq n \leq m$) incorporated in the wristwatch.

The timepiece circuit will be described hereinafter. As is well known, the timepiece circuit comprises an oscillator 15 for oscillating a reference signal of, e.g., 32,768 Hz or 4 MHz as a second reference clock signal, the circuit 16 for frequency-dividing the reference clock signal, a time counter 17 for counting a 1-second signal from the circuit 16 to calculate current time data, display controller and driver 18 and 19 for displaying the current time data, and a display section 20 which displays the current time data. The frequency divider 16 is constituted by 15-, or 20-staged binary flip-flops laterally connected. The timepiece circuit also has an alarm time memory 21 for setting alarm time upon operation of switches, a coincidence detector 22 for receiving the alarm time from the memory 21 and the current time data and thereby performing coincidence detection, the alarm driver 23 for receiving the coincidence signal from the detector 22 to generate an alarm drive signal and drive the speaker 24 for producing the alarm sound. The 1,200- and 2,400-Hz signals from the circuit 16 are also supplied to the decoder 6, the circuit 17 and the generator 9 which then perform predetermined operations.

Paging Code Detection

Figure 5:
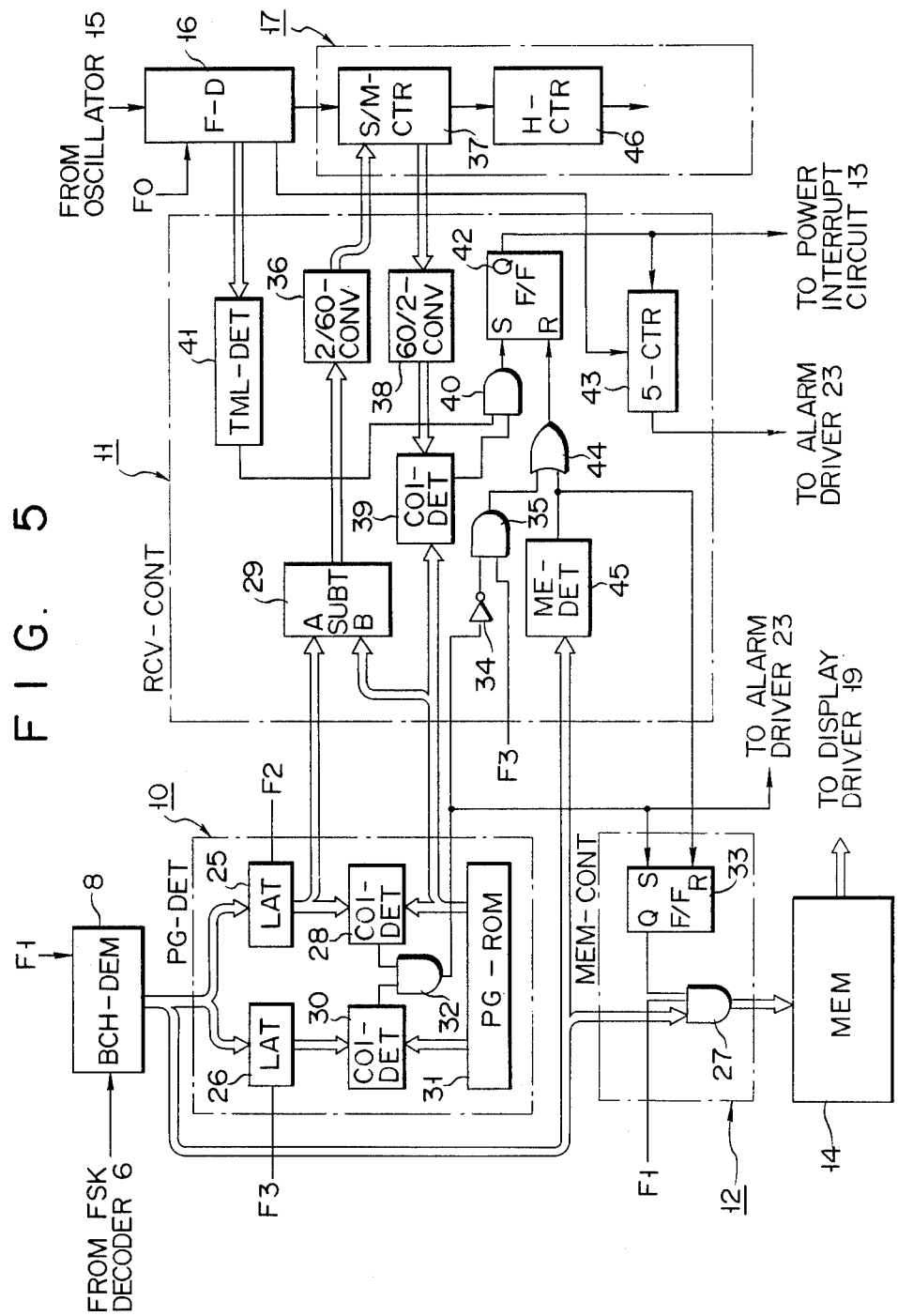
FIGS. 5 and 6 are more detailed block diagrams of the major circuits of the system shown in FIG. 2.

The paging code detector circuit 10 for detecting the paging code, and the receiving control unit 11, the memory control unit 12 and the timepiece circuit 17 of which the latter three are associated with detector circuit 10, will be described in detail with reference to FIG. 5. The circuit 8 demodulates data from the decoder 6 in response to the signal F1 input thereto. The group code of the output from the circuit 8 is supplied to a latch 25 in the circuit 10, and the individual code thereof is supplied to a latch 26. The message data is supplied to the memory 14 through an AND gate 27 in the unit 12. The latches 25 and 26 latch the code data in response to the signal F2 or F3. An output from the latch 25 is supplied to a detector 28 and the A input terminal of a subtractor 29 in the unit 11. An output from the latch 26 is supplied to a coincidence detector 30.

A group identity code of the staff respectively carrying the electronic wristwatches is supplied to one terminal of the detector 28. The group identity code is stored in a paging code mask ROM (Read Only Memory) 31. Similarly the individual code from the latch 25 and the mask ROM individual identity code is supplied to the other terminal of the detector 28. The paging code transmitted from the unit 2 of FIG. 2 is thus collated by the detectors 28 and 30 with that of the staff respectively carrying the wristwatches. The coincidence signals from the detectors 28 and 30 are supplied to an AND gate 32. An output from the AND gate 32 is supplied to the set input terminal of a flip-flop (F/F) 33 in the unit 12. The output from the AND gate 32 is also supplied to an inverter 34 in the unit 11. The inverted signal is supplied to an AND gate 35 and as the signal ALM to the driver 23.

The set output signal from the flip-flop 33 is supplied together with the signal F1 to the AND gate 27 so as to perform gating control thereof.

The paging code is supplied from the ROM 31 to the B input terminal of the subtractor 29. The subtractor 29 performs a subtraction between the paging code and the transmitted paging code, i.e., the content of the latch 25. Difference data is converted by a binary-to-60 scale converter 36 to scale-of-60 data which is set in a second-/minute counter 37 in the timepiece circuit 17. When the wristwatch gains or loses in units of seconds, the time can be corrected within the range of, for example of, $+7$ seconds to $-8$ seconds.

The second data from the counter 37 is converted by a 60 scale-to-binary converter 38 to binary data. The binary data is compared by a coincidence detector 39 with the group code read out from the ROM 31. A coincidence signal from the detector 39 is supplied to an AND gate 40. The AND gate 40 also receives the detection signal from a detector 41, so that the detector 41 detects whether or not the frequency division data from the circuit 16 is about 0.03 second (3/100 seconds). That is, it can detect whether or not the most significant 9 bits of the output from the frequency divider 16 correspond to 000001111. This detection corresponds to the operation for detecting the first 18-bit period of 600 Hz shown in FIG. 4. An output from the AND gate 40 is supplied to a set input terminal S of a flip-flop 42.

The aim of the coincidence detection by the coincidence detector 39 between the group code of ROM 31 and the second data of the counter 37 is as follows: Usually, the receiver section 5 is not supplied by the power interrupt circuit 13, but supplied by it only when the second data of the counter 37 corresponds to its own group code data.

For instance, the power supply by the power interrupt circuit 13 is carried out only when the least significant 4 bits of the group code stored in ROM 31 are 0000, and also those of the second data of the counter 37 are 0000 (0- sec., 16 sec., 32 sec., and 48 sec.) for the 0th group members. Further, it is performed only when the least significant 4 bits of the group code stored in ROM 31 are 0001, and simultaneously those of the second data of the counter 37 are 0001 (1 sec., 17 sec., 33 sec., and 49 sec.) for the first group members. Similarly, only when the least significant 4 bits of the succeeding group code are coincident with those of the respective group codes, the receiver section 5 is energized by the power interrupt circuit 13.

A set output from the flip-flop 42 is supplied to the circuit 13 and controls power on/off of a power source (not shown). The set output also drives a scale-of-5 counter 43. The counter 43 counts 1-second signals from the circuit 16. When the counter 43 counts up the 1-second signal, a count-up signal is supplied to the driver 23 which produces an alarm sound representing that the data cannot be received.

The signal F3 is supplied to the other input terminal of the AND gate 35, and an output therefrom is supplied to an OR gate 44. The message data is supplied to a message-end detector 45 which then detects an end of message in accordance with the end code affixed to the end of the message data. A detection signal from the detector 45 is supplied to the OR gate 44 and causes the flip-flop 33 in the unit 12 to reset. An output from the OR gate 44 causes the flip-flop 42 to reset.

An hour counter 46 in the timepiece circuit 17 counts carry signals from the counter 37 to obtain hour data.

The circuit 16 is compulsorily set at about 8/100. seconds (0.08 seconds) by the signal F0 included in the paging code when its own paging code is received. That is, the frequency divider circuit 16 is preset when the most significant 9 bits are 000101000. The circuit 16 is thus synchronized with the timer 2B in the unit 2 and performs time correction of the timer 2B.

Figure 6:
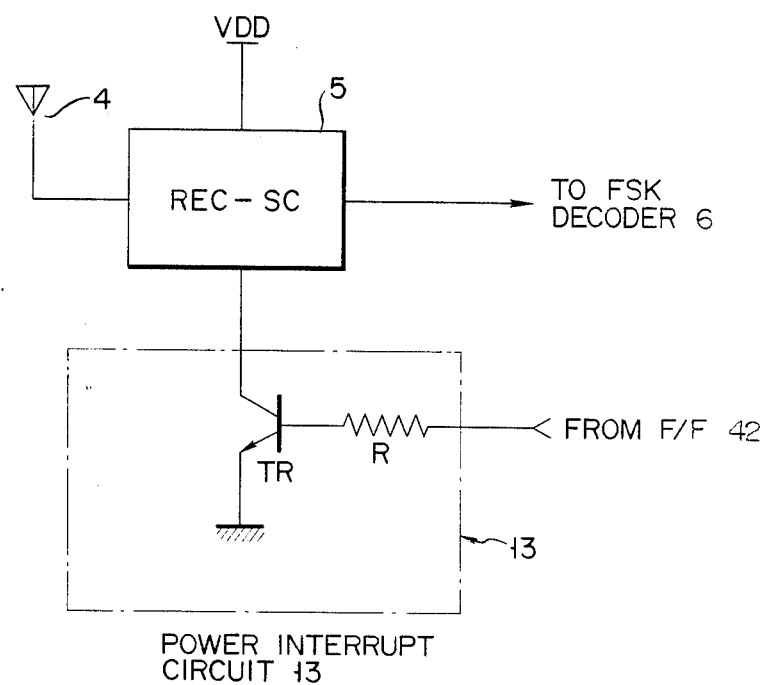

FIG. 6 shows a detailed arrangement of the power interrupt circuit 13. The circuit 13 consists of a resistor R and a switching transistor TR. The set output signal from the flip-flop 42 is supplied to the resistor R and then to the base of the transistor TR, thereby switching the transistor TR. The emitter of the transistor TR is grounded, and the collector thereof is connected to the section 5. The section 5 receives a power source voltage VDD, so that the power source voltage VDD is supplied or interrupted in accordance with the on/off operation of the transistor TR.

Paging Operation

The paging operation will be described with reference to FIG. 4 showing the data format and waveforms of associated signals.

When staff member A wishes to get in touch with staff member B, the staff member A enters a paging code and message data "Phone A" at the nearest keyboard, e.g., the keyboard $1_1$. These data are supplied to the transmitter controller 2A in the unit 2. The controller 2A judges the key-in group code of the paging code for the staff member B. For instance, for the 0th group, when the first reference clock time data in the timer 2B becomes 0.00 sec., 16.00 sec., 32.00 sec., or 48.00 sec., the clock time data is supplied to the BCD-coding circuit 2D. When the line is busy, the input data are temporarily stored in the memory 2C. Thereafter, the data is read out and transmitted.

The circuit 2D converts the input data to BCH-coded data having a frequency of 600 Hz at 600 bits/sec., and the BCH-coded data is supplied to the encoder 2E. The encoder 2E encodes actual transmission data represented by 1,200- and 2,400-Hz signals so as to send the data to the unit 2F. The transmission data is transmitted from all transmitter antennas ($2H_1$ to $2H_k$) at a predetermined frequency from 30 to 300 MHz and is received by the receiver antennas $4_1$ to $4_m$ of all the electronic wristwatches $3_1$ to $3_m$.

The received signal is supplied to all sections 5 (FIG. 3) built into the electronic wristwatches and is amplified and detected. The detected signal is supplied to the decoder 6 (See FIG. 3). The transistor TR in the circuit 13 is always kept on for a duration of every 16 seconds for each group of staff member (during scanning of 16 channels, i.e., 1 second) and at the same time for a duration (i.e., until the output signal from the flip-flop 42 in the controller 11 is set at logic "1") in which his own paging code is detected. The battery voltage VDD is supplied to perform data reception. At times other than the durations described above, the transistor TR is kept off, and the sections 5 will not receive the power source voltage VDD (See FIG. 6), thereby achieving battery power saving.

The decoder 6 decodes the signal from the section 5 and generates serial data in accordance with bit synchronization. The serial data is supplied to the circuits 7 and 8 (FIG. 4). The circuit 7 detects the frame sync data of the serial data and supplies the signals F0 to F3 to the generator 9. The circuit 8 performs BCH demodulation, and an output therefrom is supplied to the circuit 10 and the units 11 and 12.

The circuit 10 compares the transmitted paging code and the paging code preset in ROM 31. When a coincidence is not established, a signal is supplied to the unit 11 to turn off the circuit 13. The power source of the section 5 is turned off. Subsequently, a signal is supplied to the unit 12 to inhibit writing of data in the memory 14.

However, when a coincidence is detected by the circuit 10, the power source of the section 5 is turned on, and an alarm sound is generated to alert the staff that data will be transmitted to them. At the same time, the message data is written in the memory 14 and is displayed on the display section 20 for a predetermined period of time. The end of transmission data is detected by the message end detector 45 in the unit 11, and the power source for the section 5 is turned off.

The timepiece circuit always generates time data upon counting of the time counter 17 and displays the current time on the display section 20. The frequency of the circuit 16 is synchronized with the time of the timer 2B in the unit 2 in response to the signal F0 every 16 seconds, so that timing correction in units of seconds can be performed. The time correction other than in units of seconds can be performed in the unit 11 by detecting the paging error.

The reception operation of the paging code will be described in more detail. Consider an example for the 0th group of wristwatches. When the time data is set every 0.00 sec., 16.00 sec., 32.00 sec., and 48.00 sec., the second/minute data from the counter 37 is converted by the converter 38, and the converted data is supplied to one terminal of the detector 39. The detector 39 detects a coincidence between the converted data and the paging code read out from the ROM 31 and applied to the other input terminal thereof. The coincidence signal of logic "1" is supplied to the AND gate 40. When the output from the circuit 16 has reached data corresponding to about 3/100 seconds, i.e., when the first 18-bit data of the paging code of the 0th group is completed, as shown in FIG. 4, the detector 41 detects this. The signal of logic "1" is supplied from the detector 41 to the AND gate 40. For this reason, the output from the AND gate 40 is set at logic "1", and the flip-flop 42 is set. The set output signal from the flip-flop 42 goes to logic "1". The transistor TR in the circuit 13 is turned on, and the power source voltage is supplied to the section 5. At the same time, the counter 43 starts.

When 7/100 seconds (7=(18+22)/6) have elapsed and the frame sync data is detected by the circuit 7, the signal F0 is generated first from the generator 9. The signal F0 is supplied to the frequency divider circuit 16 so as to set it at 8/100 sec. and, then it is synchronized with the timer 2B, thereby performing time correction in units of seconds. The most significant part 8 bits (the group code) of the paging code received at the 16th bit after the F0 is generated are latched by the latch 25 in response to the signal F2. After reading out additional 16 bits, the least significant part 8 bits (the individual code) of the paging code are latched by the latch 26 in response to the signal F3. This latched data is compared by the detectors 28 and 30 with the paging code read out from the ROM 31. When coincidences are detected by the detectors 28 and 30, the coincidence signals of logic "1" are generated therefrom, respectively. The coincidence signals cause the flip-flop 33 to be set, so that the AND gate 27 is opened. When the signal F1 is generated every 16 bits, the message data is written in the memory 14. The alarm sound is produced upon generation of the coincidence signal of logic "1".

When message data transmission is completed, the end of message is detected by the detector 45, and the flip-flops 42 and 33 are both reset. The message data from the memory 14 is displayed on the display section 20 for a predetermined period of time. Then, the power source voltage for the section 5 is turned off.

On the other hand, when the coincidence signal from the AND gate 32 in the circuit 10 is set at logic "0", the AND gate 35 in the unit 11 is opened and the signal F0 is generated. After the flip-flop 42 accomplishes generating the signal F0 and the frame sync signal is detected, the flip-flop 42 is reset at the 32nd bit. The section 5 is immediately deenergized. This is the case wherein the paging code transmission time is not detected as that of the 0th group. Therefore, excessive power consumption of the receiver unit can be prevented.

When the wristwatches of the 0th group have gained or lost, the group code from the latch 25 is supplied to the A input terminal of the subtractor 29, and the group code from the ROM 31 is supplied to the B input terminal. A difference between the group codes is supplied to the converter 36. After the signal F0 is generated and the reception timing is not of 0th group, the counter 37 is corrected by the number of seconds corresponding to the difference. The paging code is properly received at the next 0th group reception timing.

As described above, when the reception timing is deviated or a transmission data cannot be received while the flip-flop 42 is set and the power source is kept on, neither frame synchronization can be performed nor the flip-flop 42 be reset. In this case, the power source is kept on. The counter 43 generates a carrier, and an alarm sound is produced. The staff member B carrying this receiver unit is cautioned that his unit is not functional.

The 0th paging code is transmitted every 16 seconds and the above processing can be performed.

Since the above operation can be applied to the 1st to 15th groups, a detailed description thereof will be omitted.

Arrangement of Second Embodiment

When the receiver, or the electronic wristwatch is brought into an area where the transmission data signal is not detectable, the 5 scale counter 43 for the power interrupt circuit 13 remains in the set condition. As a result, the power interrupt circuit 13 cannot be turned off unless the watch holder moves it within the service area where the transmission data signal is detectable.

If the watch holder is warned by such an out-of-service alarm and he cannot immediately bring his watch into the service area, for instance, when he is at his home, the excessive power dissipation is drained from the built-in batteries.

The following second embodiment can therefore provide another feature with respect to power saving.

Figure 8:
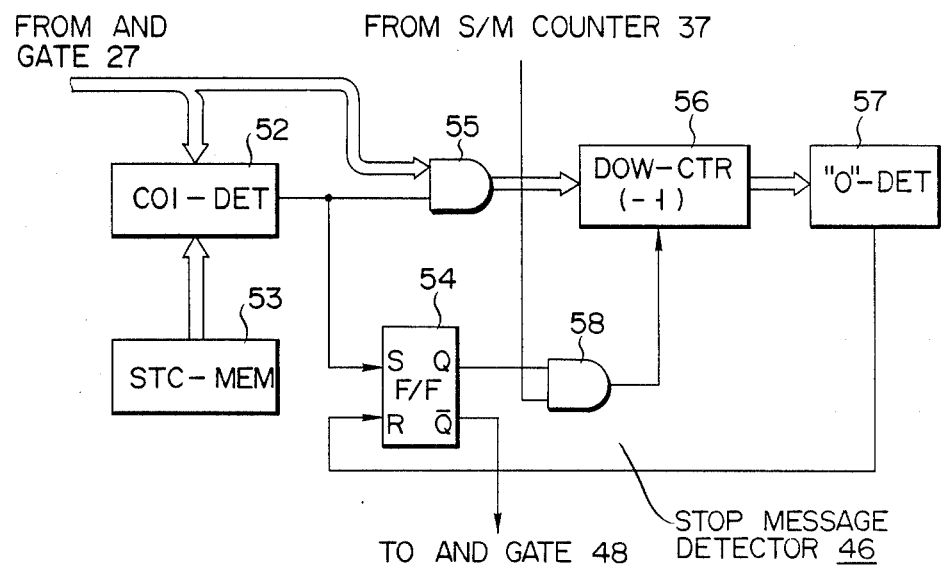

Referring to FIGS. 7 and 8, a description will be made of the second embodiment.

It should be noted that the same reference numerals are employed to the same or similar circuit components in the previous drawings.

A receiver controller 50 includes mainly a stop message detector 46, the subtracter 29, the time lapse detector 41, the message-end detector 45, the coincidence detector 39, the binary-to-60 scale counter 36, the 60 scale-to-binary counter 38, the flip-flop 42 and the 5 scale counter 43.

In synchronism with a pulse signal (1 pulse/minute) PM generated from the second/minute counter 37 in the time counter 17, the detector 46 detects stop-message data from the message data from the AND gate 27 in the unit 12. The detector 46 supplies the detection signal to one input terminal of an AND gate 48. In the same manner as in the first embodiment, the detector 41 detects the first 18-bit (3/100 seconds) time lapse of the transmission data in accordance with the signal from the frequency divider circuit 16. The detection signal from the detector 41 is supplied to the second input terminal of the AND gate 48. The subtracter 29 receives the paging code from the paging code ROM 31 at its input terminal B and performs subtraction between this paging code and the content, i.e., the paging code from the latch 25. The converter 36 converts the binary difference data from the subtracter 29 to scale-of-60 data. The scale-of-60 data is set in the counter 37.

The 60 scale-to-binary converter 38 converts the second/minute data from the counter 37 into binary data. The binary data is supplied to the coincidence detector 39. When the detector 39 detects a coincidence between the binary data from the converter 38 and the group code from the ROM 31, the coincidence signal is supplied to the first input terminal of an AND gate 40. The AND gate 40 receives the output signal from the AND gate 48 at its second input terminal. An output signal from the AND gate 40 is supplied to the set terminal of the flip-flop 42. The flip-flop 42 supplies an output signal Q to the circuit 13 and to the scale-of-5 counter 43, thereby performing the ON-OFF switching control of the circuit 13 and driving the counter 43. The counter 43 counts 1-second signals from the circuit 16. When the counter 43 counts up the 1-second signals, a count-up signal is supplied to the alarm driver 23 of FIG. 2. Therefore, the driver 23 produces an alarm sound representing that the transmission data cannot be received.

The detector 45 detects an end of message data from an end code affixed to the message data generated from the circuit 8. The detector 45 supplies a detection signal to the reset terminal of the flip-flop 33 and the first input terminal of an OR gate 44. The OR gate 44 receives the output signal from the AND gate 35 at its second input terminal. An output signal from the OR gate 44 is supplied to the reset terminal of the flip-flop 42. The AND gate 35 receives the timing signal F3 at its first input terminal. The output signal from the AND gate 32 is inverted by the inverter 34, and the inverted signal is supplied to the second input terminal of the AND gate 35.

Stop Message Detector

Referring to FIG. 8, the stop message detector 46 includes a coincidence detector 52, a stop code character memory 53, a flip-flop 54, an AND gate 55, a down counter 56, a zero detector 57 and an AND gate 58. When the message data generated from the AND gate 27 (FIG. 7) coincides with the stop code stored in the memory 53, the detector 52 supplies the coincidence signal to the first input terminal of the AND gate 55. The AND gate 55 is enabled in response to the coincidence signal from the detector 52 and transfers the message data from the AND gate 27 to the counter 56. The flip-flop 54 receives the coincidence signal from the detector 52 at its set terminal. The flip-flop 54 supplies its set output signal Q to the first input terminal of the AND gate 58. The second input terminal of the AND gate 58 receives the pulse signal PM from the counter 37 of FIG. 7. An output signal from the AND gate 58 is supplied to the clock terminal of the counter 56. The stop time data of the stop message data from the AND gate 55 is set in the counter 56, and the counter 56 is decremented by one in response to the output signal from the AND gate 58. The detector 57 eventually detects count "0" from the counter 56 and then supplies a detection signal to the reset terminal of the flip-flop 54. A reset output signal from the flip-flop 54 is supplied to the first input terminal of the AND gate 48 in the receiver controller 50 of FIG. 7.

The operation of the second embodiment will be described hereinafer. A series of initialization operations such as bit sync, frame sync and paging code detection are the same as those of the first embodiment, and a detailed description thereof will be omitted.

Assume that the stop code designating stop of reception and stop time data representing the stop time are included in the message data. The respective data are generated from the AND gate 27 in the unit 12 and are transferred to the stop message detector 46 in FIG. 7. In the detector 46, as shown in FIG. 8, the detector 52 detects a coincidence between the transferred stop code and the stop code prestored in the memory 53. When a coincidence signal is supplied from the detector 52 to one input terminal of the AND gate 55, the stop time data supplied to the other input terminal of the AND gate 55 is transferred to the counter 56. The coincidence signal from the detector 52 is supplied to the set input terminal of the flip-flop 54, and a set output signal Q therefrom is supplied to one input terminal of the AND gate 58. An inverted signal of the output from the flip-flop 54 is set at an "L" level, so that the AND gate 48 in the receiver controller 50 is disabled, i.e., is set at "L" level. The output signal Q from the flip-flop 42 in the controller 50 is set at "L" level, and the transistor TR in the circuit 13 in FIG. 6 is turned off, thereby deenergizing the section 5.

The counter 56 starts to decrement in response to the pulse signal from the AND gate 58 of FIG. 8 until the preset stop time data ends. When the detector 57 detects "zero" from the counter 56, the flip-flop 54 is reset. When the stop time preset in correspondence with the stop time data set in the counter 56 has elapsed, the flip-flop 54 is reset, and the circuit 13 is turned off. In other words, the transistor TR is turned on, and the section 5 is energized.

When the paging code and the message data are transmitted from the unit 2, the receiver unit built into the electronic wristwatch corresponding to the paging code generates an alarm sound. At the same time, the message data is displayed on the display section 20. In this case, when the message data includes the stop code and the stop time data, this receiver unit is deenergized and can stop reception. When the stop time corresponding to the stop time data has elapsed, the receiver unit is restored to the standby state for automatically receiving the transmitting data. When the receiver unit need not receive transmitting data and is stopped, power consumption can be greatly decreased. Since the transmitter unit can control the ON-OFF state of the receiver unit by using the message data, the watch holder need not perform any operation. Even if the holder forgets to turn off the power switch of the receiver unit, wasteful power consumption can be avoided.

Figure 9:
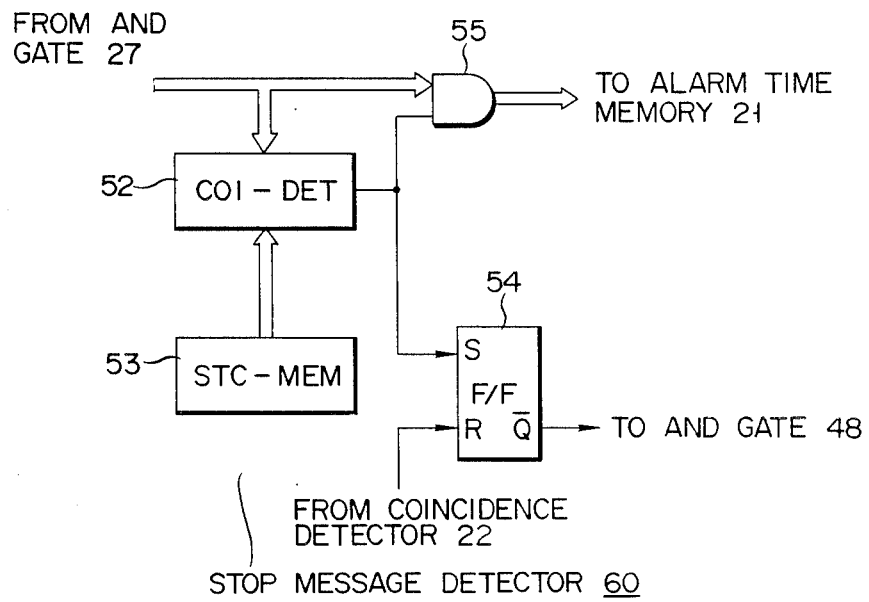
FIGS. 9, 10, and 11 are block diagrams of the modified stop message detector employed in the system according to the second embodiment.
Figure 10:
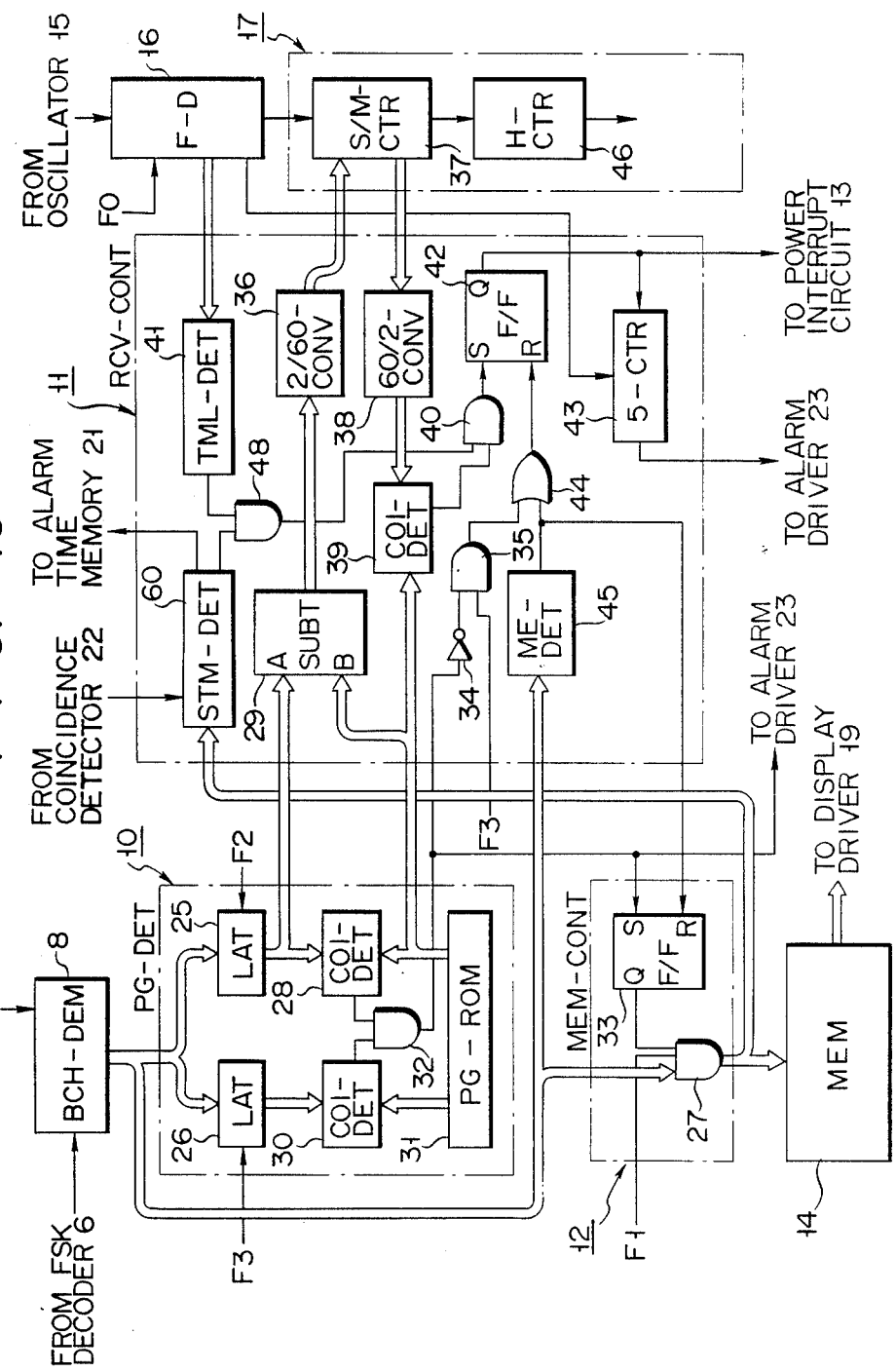
Figure 11:
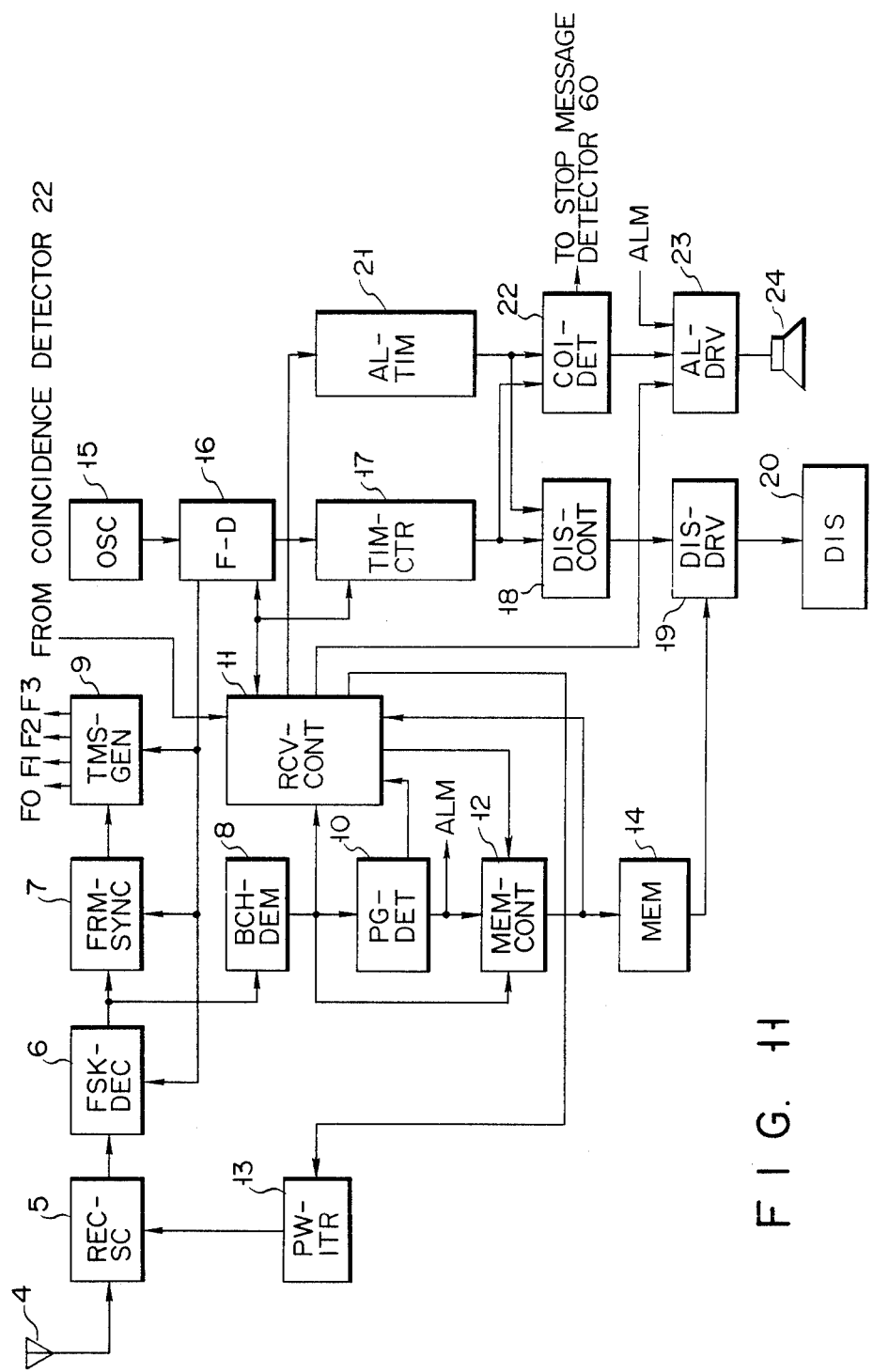

FIGS. 9 to 11 are block diagrams showing still another embodiment having the same purpose as that of the second embodiment. In brief, as shown in FIGS. 9 and 10, in the receiver control unit 11, the stop time data in the message data from the AND gate 27 is transferred by the AND gate 55 to the alarm time memory 21 of FIG. 11.

When the stop code is received and the section 5 is deenergized, the control operation for the stop time can be performed by a coincidence detector 22 in FIG. 11. When the detector 22 detects a coincidence between the time data from the time counter 17 and the stop data set in the alarm time memory 21, the detector 22 supplies the detection signal to a stop message detector 60 of FIG. 10. A flip-flop 54 set in response to the coincidence signal from the detector 52 is reset in response to the coincidence signal from the detector 22 of FIG. 11. For this reason, the circuit 13 is turned off, and the section 5 is deenergized. As a result, the unit 11 is held in the standby mode again.

With the above operation, the same power saving control as in the above embodiments can be obtained.

THIRD EMBODIMENT

According to the invention, it is also possible to transmit different alarm times together with different messag data from the single transmitter unit to the multiple receiver units. In the respective receiver units, the alarm time and the message data allocated to the individual receiver unit are once stored in its internal memory. Then, when it reaches the stored alarm time, the watch holder is warned, and the stored message data is decoded and displayed on the display panel.

In the following embodiment, the same reference numerals are employed for the same or the like circuit components as shown in the previous embodiments.

Figure 12:
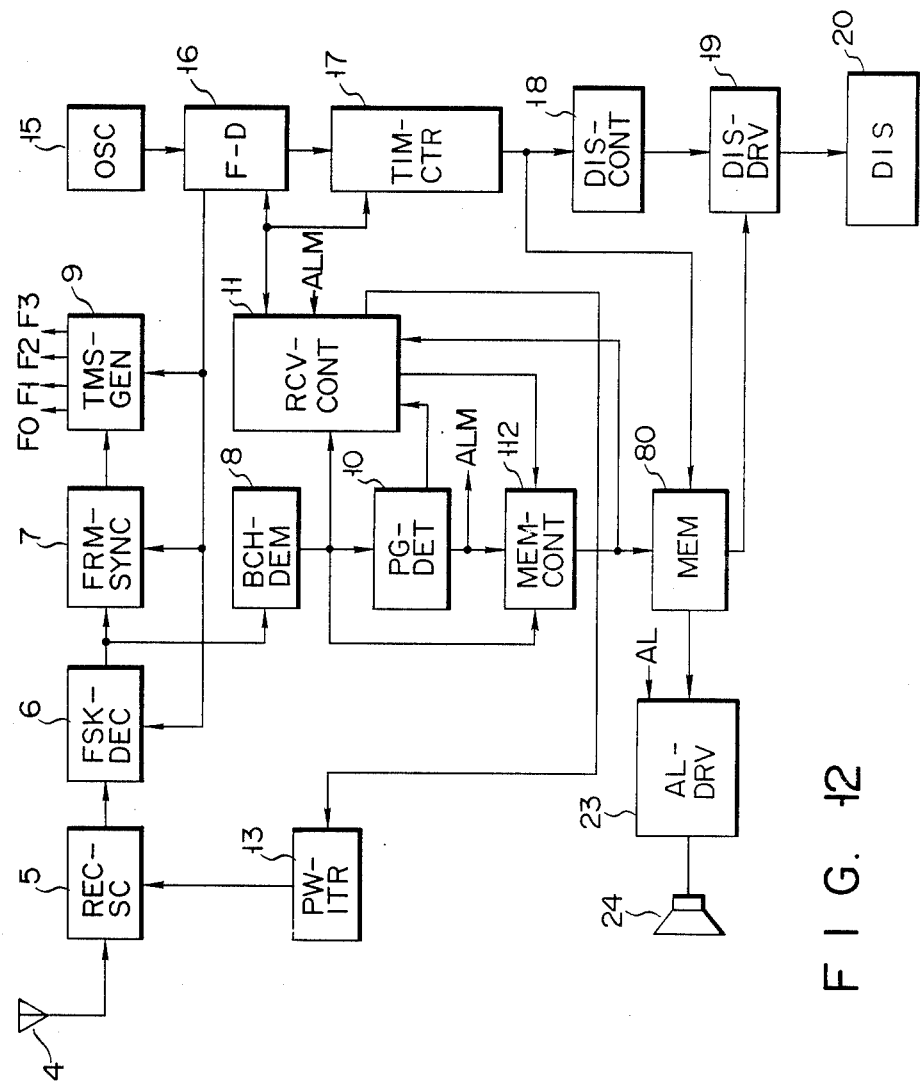
FIG. 12 is an overall block diagram of a radio communication system according to a third embodiment.
Figure 13:
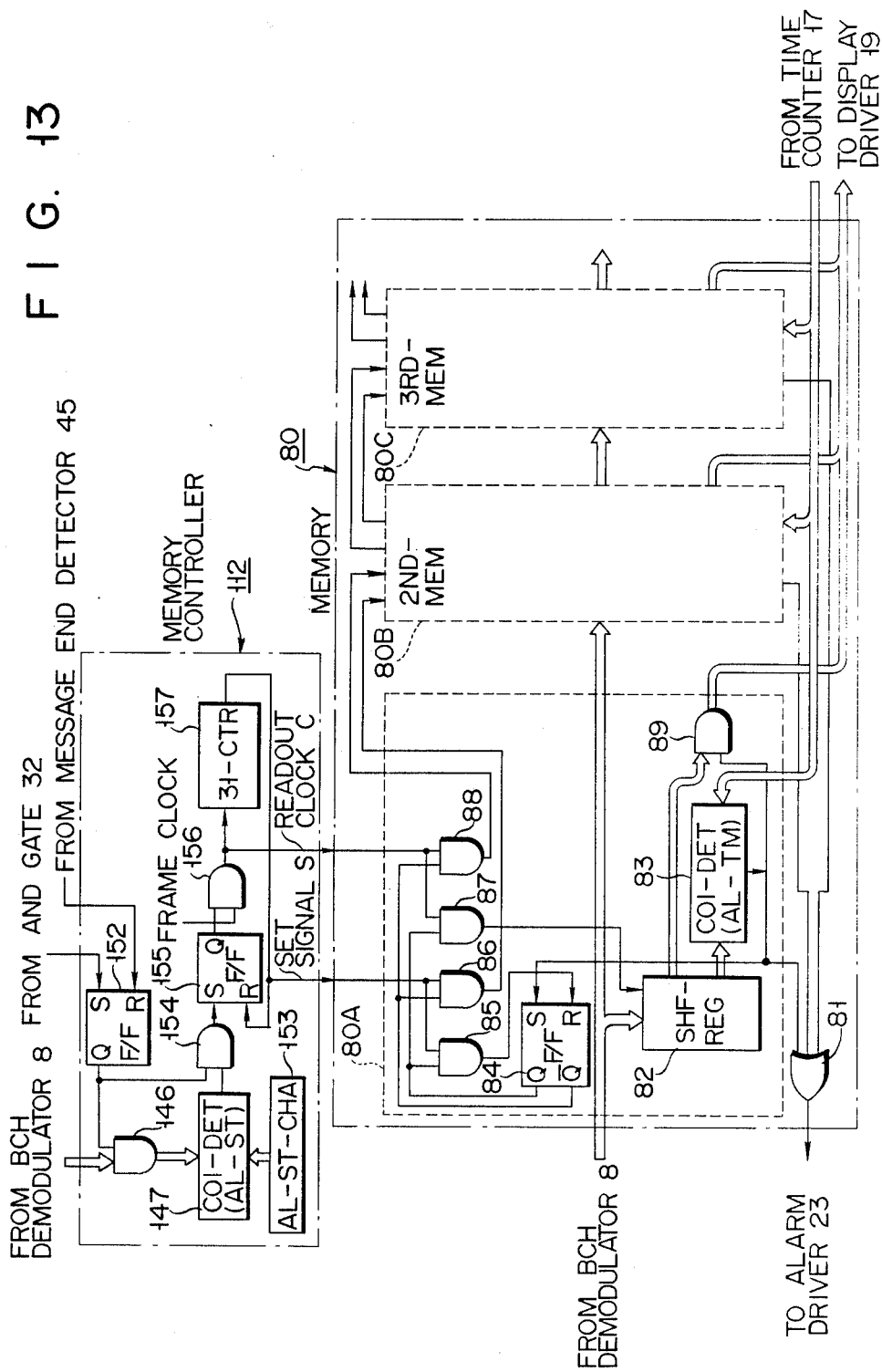
FIG. 13 is a more detailed block diagram of the major circuit of the system shown in FIG. 12.

Referring to FIGS. 12 and 13, a detailed description will now be made of a radio communication system according to the third embodiment.

The basic system configuration of the third embodiment will be briefly summarized.

As shown in FIG. 12, time data from the time counter 17 is supplied to a memory 80, and an output from the memory 80 drives the speaker 24 through the alarm driver 23. The message data is supplied from the memory 80 to the display driver 19.

The basic configuration described above will be described in detail with reference to FIG. 13. It should be noted that the paging code detector circuit 10, the receiver controller 50 and associated circuits are the same as the previous embodiment, and a description thereof will be made with reference to FIG. 10.

A memory controller 112 comprises AND gates 146, 154 and 156, a coincidence detector 147, flip-flops 152 and 155, an alarm set memory 153 and a 31 scale counter 157. The AND gate 146 supplies the signal from the BCH demodulator circuit 8 received at its first input terminal to the detector 147 in response to the output signal supplied from the flip-flop 152 to its second input terminal. A detection signal from the AND gate 32 of the circuit 10 is supplied to a set terminal S of the flip-flop 152, and a detection signal from the messageend detector is supplied to a reset terminal of the flip-flop 152. The detector 147 detects a coincidence between the alarm set character stored in the memory 153 and the alarm set character included in the receiving data. A coincidence signal from the detector 147 is supplied to the first input terminal of the AND gate 154. The second input terminal of the AND gate 154 receives the output signal from the flip-flop 152. When the output signal from the AND gate 154 is supplied to the set terminal of the flip-flop 155, the set output signal is supplied to the first input terminal of the AND gate 156. In response to the set output signal received at the first input terminal, the flip-flop 155 supplies as a readout clock C the frame clock signal received at the second input terminal to the counter 157 and the memory 80. When the counter 157 counts 32-readout clock pulses C, the set signal S is supplied to the reset terminal of the flip-flop 155 and the memory 80.

The memory 80 comprises a plurality of memories 80A to 80C and an OR gate 81. The memory 80A comprises a shift register 82, a coincidence detector 83, a flip-flop 84 and AND gates 85 to 88 and 89. The shift register 82 stores the message data from the circuit 8 in response to the clock signal from the AND gate 87. The AND gate 87 receives the readout clock C from the unit 12 at the first input terminal thereof. The second input terminal of the AND gate 87 receives the set output terminal from the flip-flop 84. The coincidence signal from the detector 83 is supplied to the set input terminal of the flip-flop 84, and the output signal from the AND gate 85 is supplied to the reset terminal thereof. The set signal S from the unit 12 is supplied to the first input terminal of the AND gate 85, and the set output signal from the flip-flop 84 is supplied to the second input terminal thereof. The read clock C and the set signal S are supplied to the second memory 80B through the AND gates 88 and 86.

The message data stored in the shift register 82 is supplied to the detector 83 and the AND gate 89. The detector 83 detects a coincidence between the data from the shift register 82 and the time data from the time counter 17. The AND gate 89 supplies the data from the shift register 82 to the display driver 19 in response to the coincidence signal from the detector 83. The coincidence signal from the detector 83 is supplied to the speaker 24 through the OR gate 81. The memories 80B and 80C have the same arrangement as that of the memory 80A.

Operations of the above-described third embodiment will now be summarized.

Referring to FIG. 13, assume that the receiving data from the AND gate 146 in the unit 12 is supplied to the detector 147. The detector 147 detects a coincidence between the alarm set character of the receiving data and the alarm set character stored in the memory 153. When a coincidence signal from the detector 147 is supplied to the AND gate 154, the flip-flop 155 is set. The readout clock C from the AND gate 156 is supplied to the AND gate 87 in the memory 80. The read clock C is supplied from the AND gate 87 to the shift register 82. The readout clock pulses C, i.e., 32 pulses are generated until the counter 157 generates the set signal S.

The message data from the circuit 8 is stored in the shift register 82 in response to the read clock C from the AND gate 87. When data storage is completed, the flip-flop 84 is held in the reset state. The alarm time data is included in the message data in the shift register 82. The alarm time data comprises data representing the time as the content of the necessary message. The alarm time data is supplied to the detector 83. The detector 83 detects a coincidence beteween the alarm time data and the time data from the time counter 17. When the coincidence signal is generated from the detector 83, it is supplied to the alarm driver 23 through the OR gate 81. Therefore, the alarm sound is generated at the speaker 24 shown in FIG. 12.

The coincidence signal from the detector 83 is supplied to the flip-flop 84 which is then held in the set state. The next message data is stored in the shift register 82. In the reset state of the flip-flop 84, the set signal S and the readout clock C are supplied to the next memory 80B upon operation of the AND gates 86 and 88. In response to a coincidence signal from the detector 83, the AND gate 89 transfers the message data (data representing all data excluding the alarm time data) from the shift register 82 to the display driver 19 shown in FIG. 12. The display section 20 displays the contents of the message while the alarm sound is generated at the speaker 24.

In the communication system utilizing the receiver unit incorporated in an electronic wristwatch, when the message data including the alarm time data is transmitted from the transmitter unit, the message data is stored in the memory 80. When the alarm time data stored in the memory 80 coincides with the time data of the time counter, an alarm sound is generated, and the message contents which have been stored in the memory 80 are displayed. The user can be paged with the alarm sound at a time represented by the alarm time data. It is possible to acknowledge the message to the user without display but with some spoken message. Since the memory 80 comprises a plurality of memories 80A to 80C, a plurality of message data for designating different alarm times can be stored therein.

FOURTH EMBODIMENT

According to the invention, another radio communication system is realized. In the above-described radio communication system, a paging code (consisting of a group code and an individual code) for each receiver unit is prestored in a ROM (generally, a programmable ROM). It is difficult to update the paging code registration. Such a system cannot provide flexibility for users' needs. For example, when all staff belonging to a specific group are paged, all of the respective paging codes must be transmitted. In the fourth embodiment shown in FIGS. 14 and 15, the communication system can easily update the registered paging code of the receiver unit and can page a plurality of users corresponding to the plurality of paging codes.

The overall system configuration of the fourth embodiment is the same as that of the first to third embodiments, and a system diagram thereof is omitted. The block diagram of FIG. 11 will be referred to as needed.

Figure 14:
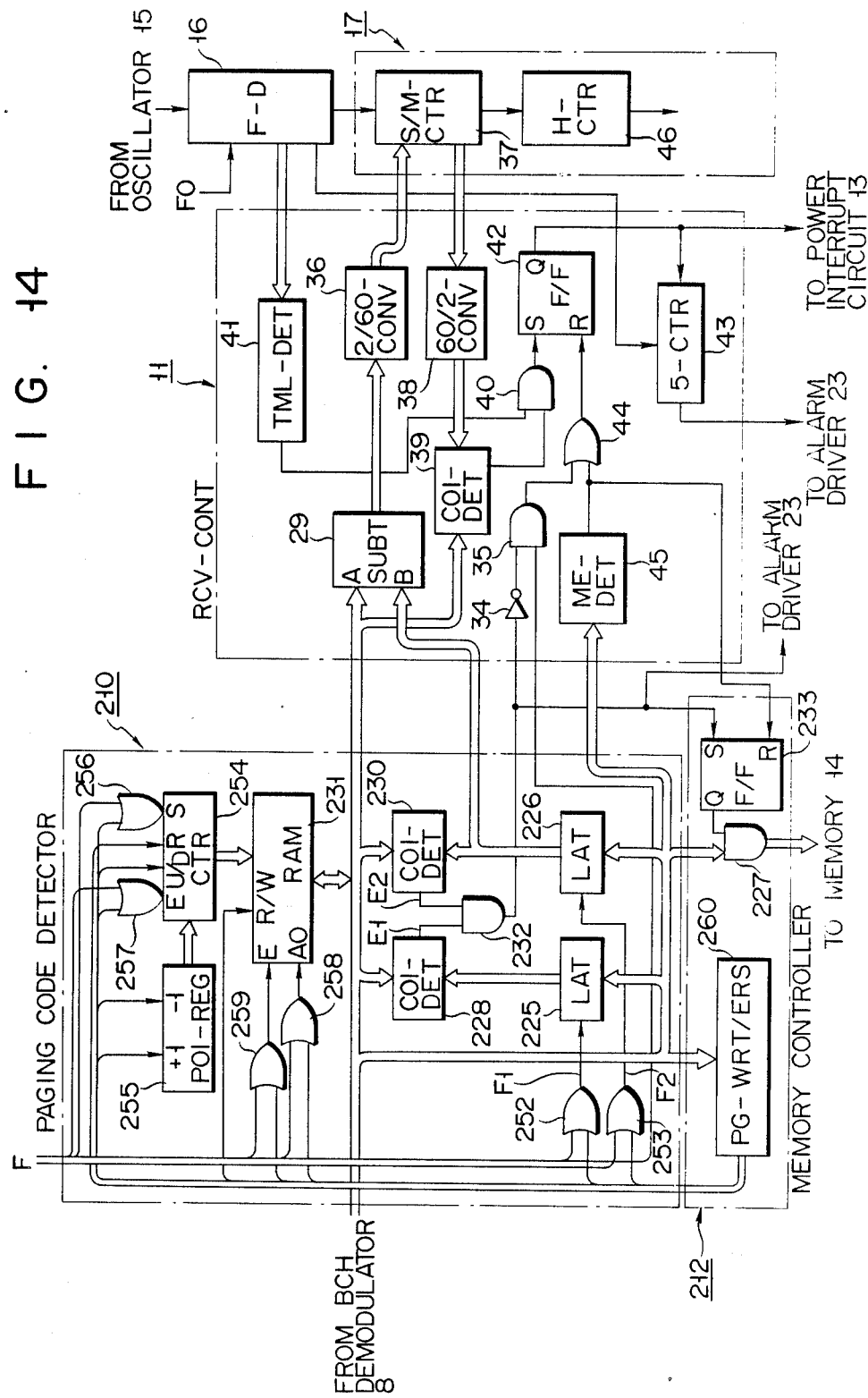
FIG. 14 is a detailed block diagram of the major circuit of the system according to a fourth embodiment.

In a paging code detector 210 in FIG. 14, the group code of the paging code data generated by the BCH demodulator circuit 8 is latched by a latch 225, and the individual code is latched by a latch 226. The latches 225 and 226 perform latching in response to timing signals F1 and F2, respectively. When the content of the latch 225 coincides with the group code prestored in a paging code RAM 231, a coincidence detector 228 supplies a coincidence signal E1 to the first input terminal of an AND gate 232. When a coincidence between the content of the latch 226 and the individual code stored in the RAM 231 is detected, a coincidence detector 230 supplies a coincidence signal E2 to the second input terminal of an AND gate 232. The RAM 231 stores the paging code at an address accessed by a counter 254. The paging code from the memory area at the accessed address is read out. A pointer register 255 sets a heading address in the counter 254 when the RAM 231 is accessed.

A memory controller 212 has an AND gate 227, a flip-flop 233 and a paging code writer 260. The gate of the AND gate 227 is controlled in response to an output signal Q from the flip-flop 233, so that the AND gate 227 transfers the message data from the circuit 8 to the memory 14. The flip-flop 233 receives the output signal from the AND gate 232 in the circuit 10 (See FIG. 11) at its set terminal. The writer 260 detects a specific code representing code registration in accordance with the message generated by the circuit 8. The registration paging code is stored in the RAM 231 in accordance with the detection result.

The unit 11 similar to the controller 212 comprises the subtracter 29, the detector 41, the message-end detector 45, the coincidence detector 39, the binary-to-60 scale converter 36, the 60 scale-to-binary converter 38, the flip-flop 42 and the scale-of-5 counter 43. The subtracter 29 receives the registration paging code from the RAM 31 at an input terminal A thereof. The subtracter 29 performs a subtraction between the registration paging code and the content of the latch 26. The converter 36 converts the binary difference data from the subtracter 29 to scale-of-60 data which is then set in the second/minute counter 37.

The converter 38 converts the scale-of-60 second/minute data from the counter 37 to binary data which is then supplied to the coincidence detector 39. The detector 39 detects a coincidence between the binary data from the converter 38 and the paging code from the RAM 231 and supplies a coincidence signal to the first input terminal of the AND gate 40. The second input terminal of the AND gate 40 receives an output signal from the detector 41 for detecting a predetermined frequency of the frequency divider circuit 16. An output signal from the AND gate 40 is supplied to the set terminal of the flip-flop 42. The flip-flop 42 supplies as the set signal the output signal Q to the power interrupt circuit 13 and the counter 43, thereby controlling the ON-OFF switching of the circuit 13 and driving the counter 43. The counter 43 counts up 1-second signals from the circuit 16 and supplies a count-up signal to the alarm driver 23. Therefore, an alarm sound is generated to indicate that the transmitting data cannot be received.

The detector 45 detects an end of message data in accordance with an end code affixed to the message data supplied from the circuit 8. The detector 45 then supplies the detection signal to the reset terminal of the flip-flop 233 and the first input terminal of the OR gate 44. The second input terminal of the OR gate 44 receives the output signal from the AND gate 35. An output signal from the OR gate 44 is supplied to the reset terminal of the flip-flop 42. The AND gate 35 receives the timing signal F at the first input terminal thereof, and the second input terminal thereof receives an inverted signal obtained by inverting the output signal from the AND gate 32 by the inverter 34.

The hour counter 46 in the time counter 17 counts carry signals from the counter 37 and generates time data. It should be noted that the circuit 16 is compulsorily set at about 9/100 seconds (0.09 seconds) in response to the timing signal F0 included in the paging code when the corresponding paging code is transmitted, and that the circuit 16 is subjected to time correction in synchronism with the reference timer 2B in the transmitter unit 2 (see FIG. 2).

PAGING CODE RAM

Referring to FIG. 15, assume that (n+1) 2-byte registration paging codes are stored at addresses 0 to (2n+1). In this case, a value n is set in the pointer register 255. When the value n is transferred from the pointer register 255 to the counter 254, the address data A1 to Ai are supplied from the counter 254 to the RAM 231. Simultaneously, the timing signal F is supplied to the address A0 of the RAM 231 through an OR gate 258. The (n+1)th registered paging code stored at the addresses 2n and (2n+1) is read out from the RAM 231 and supplied to the detector 228. The nth registered paging code stored at the addresses (2n−2) and (2n−1) of the RAM 31 are read out upon decrementing the counter 254 by one, and supplied to the detector 30. The detectors 23 and 30 compare the readout paging codes and the paging codes stored in the latches 225 and 226. This comparison is continued between the paging codes stored at the respective addresses of the RAM 231 and the paging codes latched by the latches 225 and 226 until the count of the counter 254 becomes zero. When the coincidence signals E1 and E2 are generated by the detectors 228 and 230, a signal of "H" level is generated by the AND gate 232. The flip-flop 233 is set, and the message data from the AND gate 227 is stored in the memory 14 (see FIG. 11).

During registration of the paging code in the RAM 231, a one-byte specific code for designating the code registration and a registration paging code are included in the message data transmitted from the transmitter unit. Assume that the message data is received by the receiver unit and is supplied to the circuit 10 of FIG. 11. When the writer 260 detects the specific code from the message data from the circuit 8, registration operation of the code starts. More specifically, the writer 260 increments the value of the pointer register 255, and the updated count is set in the counter 254. In this case, the writer 260 supplies an enable signal and a set signal to the counter 254 through OR gates 257 and 256. The writer 260 also sends a write signal W and the enable signal to the RAM 231. Under such control of the writer 260, the 2-byte registration paging codes following the specific code are stored in the addresses 2(n+1) and 2(n+1)+1.

In order to erase the paging code from the RAM 231, a specific code representing code erasure and the registration paging code are included in the message data to be transmitted from the transmitter unit. When the writer 260 detects the specific code instructing erasure of the code from the message data, the registered code at the address accessed by the counter 254 is read out from the RAM 231 while the counter 254 is decremented. The readout 2-byte registration paging code from the RAM 231 is compared by the detector 228 with the subsequent 2-byte paging code. When the comparison result represents a coincidence, the readout registration paging code is erased. In this case, the writer 260 causes the pointer register 255 to decrement and controls to access the highest address at which the paging code is always stored.

The paging code registration and erasure may be performed in accordance with a key input for the message data at a keyboard connected to the receiver unit. In this case, the input data entered at the keyboard is sent onto a data bus in the circuit 10 through the circuit 260, thereby performing paging code registration or erasure in the RAM 231.

In the radio communication system using the receiver unit incorporated in the electronic wristwatch, paging code registration or erasure in the RAM 231 can be easily performed. For this reason, even if user updating or new users are additionally registered, such operations can be easily performed. The updated and new users can be easily paged by the system. Furthermore, by registering a plurality of paging codes in the RAM 231 in each receiver unit, a specific user can be paged with a plurality of paging codes (paging and message transmission). For example, when a single paging code is registered for a plurality of users belonging to a specific group, the identical code can be transmitted to the plurality of users. Therefore, when the users of the specific group are paged, the respective paging codes need not be transmitted, thereby simplifying the communication operation.

In the above embodiments, FSK-modulated transmission data was sent at a given frequency from 30 to 300 MHz. However, the transmission frequency as well as modulation system may be arbitrarily selected. In the above embodiments, only the section 5 in the receiver unit was subjected to power ON-OFF switching. However, all the circuits in the receiver unit can be similarly turned on/off. Furthermore, the receiver unit may be provided with a switch for turning on/off the receiver unit when the user enters a building. In the above embodiments, transmission/reception was performed only within a single building. However, users can communicate with each other outdoors. Furthermore, in the above embodiments, the receiver unit was built into the wristwatch. However, the receiver unit may be built into portable electronic equipment such as a portable electronic calculator. In the above embodiments, an individual code was provided for the receiver unit, transmitted at a single frequency and identified by the receiver unit. However, the receiver unit may have functions for sensing different frequencies, thereby achieving individual paging. Furthermore, receiver units may be divided into groups for different frequencies, and each individual user of the same frequency in each group can be selected in accordance with an individual code.

What is claimed is:

1. A radio communication system including a transmitter end for transmitting transmission data comprised of at least group code data associated with a receiver end and message data to be transmitted, and a plurality of receiver ends for receiving the transmission data from the transmitter end, each said receiver end comprising:
   (a) receiving means for receiving the transmission data from the transmitter end when energized by a supply voltage;
   (b) a power source for providing said supply voltage;
   (c) a clock pulse generator supplied with the voltage from said power source, for generating a reference clock pulse signal;
   (d) frequency divider means for frequency-dividing the reference clock pulse signal generated by said clock pulse generator;
   (e) group code memory means for storing group code data;
   (f) first coincidence detecting means for detecting that a frequency dividing ratio of said frequency divider means coincides with the group code data of said group code memory means, and for producing a corresponding first detection signal;
   (g) power supplying means for supplying the voltage from said power source to said receiving means in response to said first detection signal, wherein said power supplying means enables said receiving means to receive the transmission data from the transmitter end;
   (h) second coincidence detecting means for detecting a coincidence of the group code data within the transmission data received by said receiving means and the group code data stored in said group code memory means, and for producing a corresponding second detection signal;
   (i) control means for processing the message data within the transmission data in response to said second detection signal; and
   (j) correcting means for correcting the frequency dividing ratio of said frequency divider means based on the group code data of the received transmission data, and for synchronizing the timing in which voltage is supplied to said receiving means by said power supplying means with the group code data received from said transmitter end.

2. A system as claimed in claim 1, comprising a keying unit coupled to the transmitter end, for imputting information representing both a certain receiver end to be addressed, and associated message information.

3. A system as claimed in claim 1, wherein the transmitter end includes means for generating first reference clock pulses, and means for carrying out a frequency shift keying modulation in conjunction wiht said first reference clock pulses.

4. A system as claimed in claim 3, wherein the transmitter end includes a BCH coding circuit for producing both a paging code and message data in a BCH-coded format, and a frequency-shift-keying encoder for encoding both the BCH-coded paging code and message data in response to said first reference clock pulses to produce frequency-shift-keying modulated transmission data.

5. A system as claimed in claim 1, wherein said control means of said receiver end comprises a storage device for storing the received message data.

6. A system as claimed in claim 1, wherein said receiver end comprises display means for displaying the received message data.

7. A system as claimed in claim 1, wherein said receiving means of said receiver end comprises alarm means for alarming the receipt of said message data.

8. A system as claimed in claim 1, wherein said correcting means of said receiver end comprises calculating means for calculating a difference between the group code of said transmission data and the group code data stored in said group code memory means, and for correcting the frequency dividing ratio of said frequency divider means based on the calculated difference.

9. A radio communication system including a transmitter end for transmitting transmission data comprised of at least group code data associated with a receiver end, individual code data and message data to be transmitted, and a plurality of receiver ends including receiving means for receiving the transmission data from the transmitter end, each said receiver end comprising:
(a) a power source for providing a supply voltage;
(b) a clock pulse generator supplied with the voltage from said power source to generate a reference clock pulse signal;
(c) frequency divider means for frequency-dividing the reference clock pulse signal generated by said clock pulse generator;
(d) code memory means including a group code memory section for storing group code data, and an individual code memory section for storing individual code data;
(e) first coincidence detecting means for detecting that a frequency dividing ratio of said frequency divider means coincides with the group code data of said group code memory section, and for producing a corresponding first detection signal;
(f) power supplying means for supplying the voltage from said power source to said receiving means in response to said first detection signal, said power supplying means enabling said receiving means to receive the transmission data from the transmitter end;
(g) second coincidence detecting means for detecting a coincidence of the group code data within the transmission data received by said receiving means and the group code data stored in said group code memory section, and a coincidence of the individual code data of the transmission data and the individual code data stored in said individual code memory section, and for producing a corresponding second detection signal;
(h) message data memory control means for storing message data within the transmission data in response to said second detection signal;
(i) display means for displaying the message data stored in said message data memory means;
(j) calculating means for calculating a difference between the group code data within the transmission data and the group code data stored in said group code memory section; and
(k) correcting means for correcting a divided frequency value of said frequency divider means based on calculation result data obtained by said calculating means, and for synchronizing the timing in which voltage is supplied to said receiving means by said power supplying means with the group code data received from said transmitter end.

10. A radio communication system including a transmitter end for transmitting transmission data comprised of at least paging code data associated with a receiver end and message data to be transmitted, and a plurality of receiver ends including receiving means for receiving the transmission data from the transmitter end, each said receiver end comprising:
(a) a power source for providing a supply voltage;
(b) a clock pulse generator supplied with the voltage from said power source to generate a reference clock pulse signal;
(c) frequency divider means for frequency-dividing the reference clock pulse signal generated by said clock pulse generator to obtain time data;
(d) display means for displaying time data obtained by said frequency divider means;
(e) paging code memory means for storing paging code data;
(f) first coincidence detecting means for detecting that a frequency dividing ratio of said frequency divider means coincides with the paging code data of said paging code means, and for producing a corresponding first detection signal;
(g) power supplying means for supplying the voltage from said power source to said receiving means in response to said first detection signal, said power supplying means enabling the receiving means to receive the transmission data from the transmitter end;
(h) second coincidence detecting means for detecting a coincidence of paging code data within the transmission data received by said receiving means and the paging code data stored in said paging code memory means, and for producing a corresponding second detection signal;
(i) message data memory means for storing message data within said transmission data in response to said second detection signal;
(j) display control means for displaying the message data stored in said message data memory means on said display means;
(k) correcting means for correcting a frequency dividing ratio of said frequency divider means based on the paging code within the transmission data, and for synchronizing the timing in which voltage is supplied to said receiving means by said power supplying means with the paging code data received from said transmitter end.

11. A radio communication system including a transmitter end for transmitting transmission data comprised of at least paging code data and paging time data associated with a receiver end and message data to be transmitted, and a plurality of receiver ends including receiving means for receiving the transmission data from the transmitter end, each said receiver end comprising:
(a) a power source for providing a supply voltage;
(b) a clock pulse generator supplied with the voltage from said power source to generate a reference clock pulse signal;
(c) frequency divider means for frequency-dividing the reference clock pulse signal generated by said clock pulse generator to obtain time data;
(d) paging code memory means for storing paging code data;
(e) power supplying means for supplying the voltage from said power source to said receiving means based on a frequency dividing ratio of said frequency divider means, said power supplying means enabling the receiving means to receive the transmission data from the transmitter end;

(f) coincidence detecting means for detecting a coincidence of paging code data within the transmission data received by the receiving means and the paging code data stored in said paging code memory means, and for producing a corresponding detection signal;

(g) data memory means for storing paging time data and message data within said transmission data in response to said detection signal;

(h) display control means for comparing the paging time data stored in said data memory means with the time data obtained by said frequency divider means, and for displaying the message data stored in said data memory means; and (i) correcting means for correcting the frequency dividing ratio of said frequency divider means, based on the paging code data within the transmission data, and for synchronizing the timing in which voltage is supplied to said receiving means by said power supplying means with the paging code data received from said transmitter end.

* * * * *